US006870341B2

(12) United States Patent
Nagaoka et al.

(10) Patent No.: US 6,870,341 B2
(45) Date of Patent: Mar. 22, 2005

(54) METHOD OF CONTROLLING THE COORDINATIVE LIFTING OF BOTTOM SECTIONS OF LYING FURNITURE SUCH AS A BED

(75) Inventors: Hiroshi Nagaoka, Tokyo (JP); Masao Horitani, Tokyo (JP); Satoru Inoue, Tokyo (JP)

(73) Assignee: Paramount Bed Co., Ltd., Tokyo (JP)

( * ) Notice: Subject to any disclaimer, the term of this patent is extended or adjusted under 35 U.S.C. 154(b) by 14 days.

(21) Appl. No.: 10/411,083

(22) Filed: Apr. 11, 2003

(65) Prior Publication Data

US 2003/0221258 A1 Dec. 4, 2003

(30) Foreign Application Priority Data

Apr. 15, 2002 (JP) ........................................ 2002-112548

(51) Int. Cl.[7] ........................................ G05B 5/00
(52) U.S. Cl. .................... 318/475; 3187/466; 3187/445
(58) Field of Search ................................ 318/475, 466, 318/445, 489, 488; 5/613, 446; 600/300

(56) References Cited

U.S. PATENT DOCUMENTS 4,799,276 A * 1/1989 Kadish .......................... 5/613
5,469,591 A * 11/1995 Nomura .......................... 5/613
6,287,253 B1 * 9/2001 Ortega et al. ............... 600/300

* cited by examiner

*Primary Examiner*—Karen Masih
(74) *Attorney, Agent, or Firm*—Townsend & Banta

(57) ABSTRACT

A method of controlling the coordinative lifting of bottom sections of lying furniture such as a bed that has a back bottom section for lifting the back portion of a lying person and a knee bottom section for lifting his/her knee portion, in which the respective bottom sections can be lifted by the lifting mechanisms respectively provided for them, characterized in that the back bottom section is provided with an external force detecting means for detecting the external force in the sliding direction acting on the back of the lying person when the back bottom section is lifted while the knee bottom section is kept lifted, that when the back bottom section is pivotally rotated and lifted to be kept inclined from a flat state where all the bottom sections are kept down to lie flat, the knee bottom section is also adequately lifted, and that when the external force in the sliding direction acting on the back of the lying person, detected by said external force detecting means, has risen to a preset value, the knee bottom section is controlled to descend.

20 Claims, 6 Drawing Sheets

METHOD OF CONTROLLING THE COORDINATIVE LIFTING OF BOTTOM SECTIONS OF LYING FURNITURE SUCH AS A BED

FIELD OF THE INVENTION

The present invention generally relates to a method of controlling a coordinative lifting of bottom sections for lying furniture such as a bed (hospital bed, ICU bed, long term care bed, etc.) or a stretcher. In more detail, it relates to a coordinative lifting control method for lifting a back bottom section for lifting the back portion of a lying person and a knee bottom section for lifting his/her knee portion in a coordinative manner for achieving the following object, on lying furniture having the back bottom section and the knee bottom section.

BACKGROUND OF THE INVENTION (Prior Art)

Some of lying furniture such as beds and stretchers are respectively provided with a back bottom section for lifting the back portion of a lying person and a knee bottom section for lifting his/her knee portion, which can be respectively lifted by lifting mechanisms respectively provided for them.

Many examples of such lying furniture can be seen in U.S. Pat. Nos. 5,469,591, 5,448,789, 5,388,290, etc.

For example, the bed described in U.S. Pat. No. 5,469,591 has a back bottom section for lifting the back portion of a lying person, a knee bottom section for lifting his/her knee portion, and other bottom sections. On the undersides of the back bottom section and the knee bottom section, lifting arms each having a roller at the tip are installed pivotally rotatably, and the lifting arms can be driven and rotated by electric drive mechanisms such as motors.

In this constitution, the lifting arm of the back bottom section is pivotally rotated to let its roller lift the back bottom section in a pivotally rotating motion, for making it inclined, thereby lifting the back of the lying person, so that he/she can get up on the bed.

When the back bottom section is lifted and inclined like this, the lifting arm of the knee bottom section is pivotally rotated to let its roller lift the knee bottom section in a pivotally rotating motion, for making it inclined, thereby effectively preventing that the lying person slides forward if the back bottom section only is lifted.

That is, in the case where the person lying on the bed is lifted at his/her back, to get up, if the back bottom section is lifted, his/her body gradually slides forward since he/she is pressed forward at his/her back by the back bottom section. As a result, the point at which his/her body can be easily bent shifts from the pivot of the back bottom section. So, a force for bending the lumbar vertebra portion unlikely to be bent is applied from the back bottom section, to press the lumber vertebra portion and the abdominal portion of the lying person, making him/her feel displeasure.

Therefore, if the knee bottom section is lifted when the back bottom section is lifted, the body portion located above the inclined knee bottom section, i.e., femoral regions can receive the force applied from the back bottom section to press the lying person forward. As a result, the downward body sliding and displeasure feeling caused when his/her back only is lifted by means of the back bottom section can be prevented.

The conventional methods for also lifting the knee bottom section when lifting the back bottom section include, for example, the following.

a. As a first example, the drive mechanisms for lifting the back bottom section and the knee bottom section are operated respectively independently, and the lying person per se or a nurse simultaneously or alternately turns on and off the respective drive mechanisms, using, for example, remote control switches, to lift the back bottom section and the knee bottom section respectively to desired positions.

b. As a second example, a common motor or the like is used to drive the drive mechanisms of the back bottom section and the knee bottom section using an interlocking mechanism such as a link mechanism, so that the drive mechanisms of the back bottom section and the knee bottom section can be actuated in a mechanically interlocked manner, to lift the back bottom section and the knee bottom section to predetermined positions.

(Problems of the Prior Art)

However, these conventional methods have the following problems.

A. In the method a, the lying person or a nurse must simultaneously or alternately operate the respective drive mechanisms of the back bottom section and the knee bottom section. This operation is very complicated and troublesome, and the operator must be accustomed to it. Furthermore, it is difficult to always reproduce the optimum lifting states respectively for the back bottom section and the knee bottom section.

B. In the method b, since an interlocking mechanism is used, the lifting states of the back bottom section and the knee bottom section achieved in an interlocked manner are inevitably simple and cannot be adjusted or changed, and it is difficult to efficiently prevent both the downward body sliding and the displeasure feeling such as pressure feeling. Furthermore, the back bottom section and the knee bottom section cannot be operated respectively independently.

C. In both the methods a and b, if the knee bottom section is lifted when the back bottom section is lifted, the back bottom section lifts the back of the lying person with his/her waist portion supported by the lifted knee bottom section, it arises that the back of the lying person tends to slide upwardly against the frictional resistance. So, the external force in the sliding direction caused by the frictional acting between his/her back and the back bottom section, hence a mattress, acts on his/her back, and if the lifting of the back bottom section and the lifting of the knee bottom section continue without any control, the angle formed between the back bottom section and the knee bottom section becomes gradually small to gradually bend his/her abdominal region, finally letting him/her feel a pressure.

SUMMARY OF THE INVENTION

This invention has been made in view of the above problems, and relates to a method of controlling the coordinative lifting of bottom sections of lying furniture such as a bed that has a back bottom section for lifting the back portion of a lying person and a knee bottom section for lifting his/her knee portion, in which the respective bottom sections can be lifted by the lifting mechanisms respectively provided for them, wherein when the back bottom section is pivotally rotated and lifted to be kept inclined from a flat state where all the bottom sections are kept down to lie flat, both the downward body sliding and the displeasure feeling such as pressure feeling can be efficiently prevented.

The first mode of this invention proposes a method of controlling the coordinative lifting of bottom sections of lying furniture such as a bed that has a back bottom section for lifting the back portion of a lying person and a knee bottom section for lifting his/her knee portion, in which the respective bottom sections can be lifted by the lifting mechanisms respectively provided for them, characterized in that the back bottom section is provided with an external force detecting means for detecting the external force in the sliding direction acting on the back of the lying person when the back bottom section is lifted while the knee bottom section is kept lifted, that when the back bottom section is pivotally rotated and lifted to be kept inclined from a flat state where all the bottom sections are kept down to lie flat, the knee bottom section is also adequately lifted, and that when the external force in the sliding direction acting on the back of the lying person, detected by said external force detecting means, has risen to a preset value, the knee bottom section is controlled to descend.

The second mode of this invention proposes a method of controlling the coordinative lifting of bottom sections of lying furniture such as a bed that has a back bottom section for lifting the back portion of a lying person and a knee bottom section for lifting his/her knee portion, in which the respective bottom sections can be lifted by the lifting mechanisms respectively provided for them, characterized in that the back bottom section is provided with a displacement detecting means for detecting the displacement of a lying person, caused when the back bottom section is lifted while the knee bottom section is kept lifted, that when the back bottom section is pivotally rotated and lifted to be kept inclined from a flat state where all the bottom sections are kept down to lie flat, the knee bottom section is also adequately lifted, and that when the displacement of the upper half of the lying person, detected by said displacement detecting means, reaches a preset value, the knee bottom section is controlled to descend.

In this method, when the back bottom section is pivotally rotated and lifted to be kept inclined from a flat state where all the bottom sections are kept down to lie flat, the knee bottom section is also lifted. Since the knee bottom section is lifted, the knee bottom section supports the position of the waist of the lying person. Therefore, even if the back bottom section is lifted in this state, to be gradually sharply inclined, it can be prevented that he/she slides down.

If the knee bottom section is lifted when the back bottom section is lifted as described above, the back bottom section lifts the back of the lying person, with his/her waist portion supported by the knee bottom section, it arises that the back of the lying person tends to slide upwardly against the frictional resistance. So, the external force in the sliding direction caused by the frictional force acting between his/her back and the back bottom section, hence the mattress, acts on his/her back, that is, the external force for pressing the back and the like downward acts on his/her back. Furthermore, if the lifting of the back bottom section and the lifting of the knee bottom section continue without any control, the angle formed between the back bottom section and the knee bottom section becomes gradually small to gradually bend his/her abdominal region, to finally let him/her feel a pressure.

However, in the first mode of this invention, when the external force in the sliding direction acting on the back and the like of the patient, detected by said means of detecting the external force in the sliding direction, has risen to a preset value, the knee bottom section is controlled to descend. So, it can be prevented that the lifting of the knee bottom section continues without any control, and for this reason, it does not happen at all that the angle formed between the back bottom section and the knee bottom section becomes smaller than a certain angle.

Furthermore, in the second mode of this invention, said displacement detecting means detects the displacement of the upper half of the lying person caused by the external force in the sliding direction, and when the value reaches a preset value, the knee bottom section is controlled to descend. So, either in this mode, it can be prevented that the lifting of the knee bottom section continues without any control, and for this reason, it does not happen at all that the angle formed between the back bottom section and the knee bottom section becomes smaller than a certain angle.

Therefore, in both the above-mentioned modes, it can be prevented that the back bottom section and the knee bottom section gradually bend the abdominal region of the lying person, to let him/her feel a pressure.

The external force detecting means for causing the above-mentioned action in the first mode can consist of a plate corresponding to the back of the lying person, a base supporting the plate movably in the plane direction and strain gauges installed between the plate and the base.

Furthermore, as the displacement detecting means for causing the above-mentioned action in the second mode, an imaging means is installed at the back bottom section for imaging the head of the lying person from a lateral side, to ensure that the displacement of the imaged head of the lying person can be detected in reference to the displaced image of the head obtained by the imaging means.

Furthermore, the displacement detecting means can be, plural light beam type object detectors, each consisting of a light emitting section and a light receiving section, installed at the back bottom section in such a manner that the light beams cross the head region of the lying person, or can also be, a distance sensor installed at the back bottom section for measuring the distance to the vertex of the lying person, to detect the change of the distance.

Furthermore, as for the lifting of the back bottom section and the lifting of the knee bottom section for causing the above-mentioned action, both can be started simultaneously.

When the back bottom section is pivotally rotated and lifted to be kept inclined from a flat state where all the bottom sections are kept down to lie flat, at first the lifting of the knee bottom section is started. So, the lifted knee bottom section reliably supports the position of the waist of the lying person from the beginning. Therefore, even if the lifting of the back bottom section is started in this state to gradually sharply incline the back bottom section, his/her downward sliding can be prevented.

In another embodiment, since the preset value of the external force in the sliding direction or the preset value of the displacement respectively for the above-mentioned control action can be changed, the lifting of the knee bottom section can be controlled in response to the difference of each person in feeling the pressure.

DETAILED DESCRIPTION OF THE PREFERRED EMBODIMENTS

Preferred embodiments of this invention are described below in more detail in reference to the attached drawings.

As described above, FIG. 1 is a side view showing, as an example, the entire bed to which the method of controlling the coordinative lifting of bottom sections of this invention is applied. The illustrated bed is composed of a back bottom section 1*a* for lifting the back portion of a lying person, a knee bottom section 1*b* for lifting his/her knee portion, and a leg bottom section 1*c* corresponding to his/her leg portion. The back bottom section 1*a*, the knee bottom section 1*b* and the leg bottom section 1*c* are connected with each other to form a bendable bottom corresponding to the whole body, and supported by a bed frame 2. Furthermore, a mattress 3 is provided on the back bottom section 1*a*, the knee bottom section 1*b* and the leg bottom section 1*c*. The support mechanism for supporting and lifting the divided plural bottom sections on the bed frame 2 is not illustrated here since it is well known.

In the bed of this example, the bottom corresponding to the whole body is composed of the above-mentioned divided three bottom sections 1*a*, 1*b* and 1*c* connected with each other. However, the bottom can also be divided into four portions, or as described, for example, in the aforesaid U.S. Pat. Nos. 5,469,591, 5,448,789 and 5,388,290, many members can be connected with each other to form a bendable bottom. Anyway the bed to which this invention is applied is only required to have a back bottom section for lifting the back portion of the lying person and a knee bottom section for lifting his/her knee portion.

Furthermore, the lifting mechanisms for lifting the back bottom section 1*a* and the knee bottom 1*b* portion can be the mechanisms as described, for example, in the aforesaid U.S. Pat. Nos. 5,469,591, 5,448,789 and 5,388,290. That is, a lifting arm having a roller at the tip, which can be pivotally rotated by an electric drive mechanism such as a motor, can be installed to let the roller lift and support each bottom section, or a linear motion member with a rotary motion-linear motion conversion mechanism consisting of a threaded shaft and a female screw engaged with it can be connected with an arm installed on the underside of each bottom section.

The lifting mechanisms for lifting the back bottom section 1*a* and the knee bottom section 1*b* are so constituted that they can be of course controlled in a coordinative manner as described later, or in addition, can also be controlled to actuate the respective bottom sections individually as required.

Figure 1:
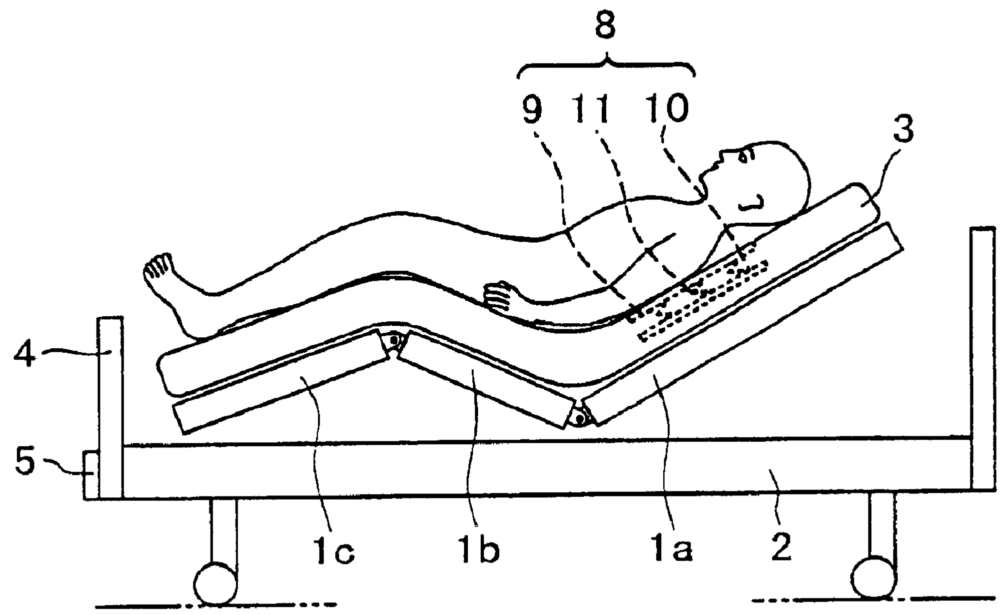
FIG. 1 is a side view showing an example of the entire bed to which the method of controlling the coordinative lifting of bottom sections of this invention is applied.
Figure 2:
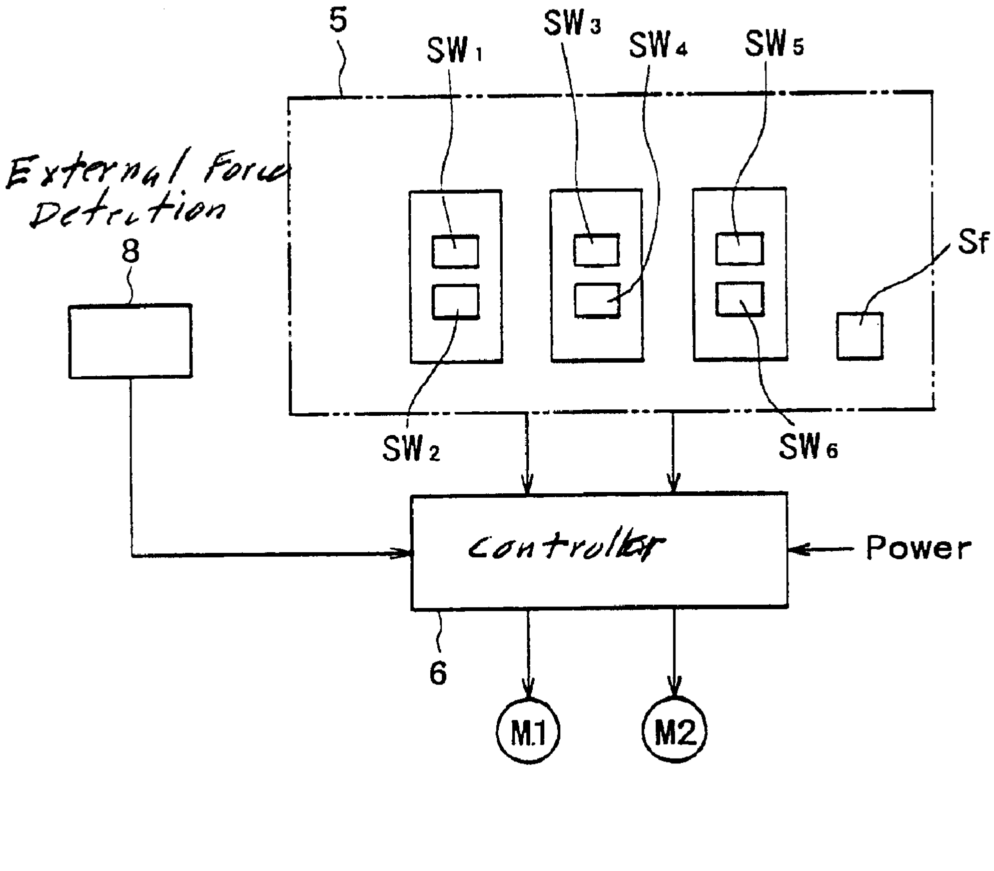
FIG. 2 is a diagram for illustrating an example of the control mechanism of the bed to which the method of controlling the coordinative lifting of bottom sections of this invention is applied.

An example of the control mechanism for the bed to which the method of controlling the coordinative lifting of bottom sections of this invention is applied is described in reference to FIGS. 1 and 2. Symbol 4 denotes a footboard, and a control panel 5 is installed on the lower outside portion of the footboard 4. The control panel 5 contains the control switches shown in FIG. 2.

The control panel 5 contains switches SW1 and SW2 for lifting and lowering the back bottom section 1*a* and switches SW3 and SW4 for lifting and lowering the knee bottom section 1*b*. These switches allow the back bottom section and the knee bottom section to be lifted and lowered independently.

The control panel 5 also contains switches for lifting and lowering the back bottom section 1*a* and the knee bottom section 1*b* in a coordinative manner, i.e., lifting and lowering switches SW5 and SW6 in addition to the above-mentioned switches.

On the other hand, the back bottom section 1*a*, i.e., the mattress 3 in this case is provided with an external force detecting means 8 for detecting the external force in the sliding direction acting on the back and the like of the lying person. The external force detecting means 8 consists of, as typically shown in FIG. 1, a plate 9 corresponding to the back of the lying person, a base 10 supporting the plate 9 movably in the plane direction, and strain gauges installed between the plate 9 and the base 10. Apart from this constitution, the external force detecting means 8 can also be adequately constituted using, for example, a pressure sensor, if it can detect the external force in the sliding direction acting on the back and the like of the lying person.

Symbol 6 denotes a controller that controls the on and off actions of the motors M1 and M2 used for operating the back bottom section 1*a* and the knee bottom section 1*b*. The output signals of the external force detecting means 8 are applied to the controller 6.

On the other hand, said control panel 5 is provided with an external force setting section Sf for storing a preset value, to ensure that the controller 6 can judge whether or not the value of the external force in the sliding direction applied from said external force detecting means 8 reaches the preset value.

A case where the back bottom section and the knee bottom section are operated in a coordinative manner in the above-mentioned constitution is described below.

Figure 3:
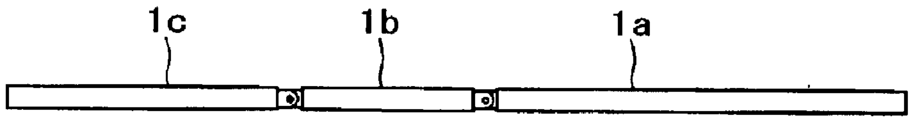
FIG. 3 is a side view showing the entire form of a bottom in a state where all the bottom sections are kept down to lie flat.

FIG. 3 shows a state where all the bottom sections 1*a*, 1*b* and 1*c* are kept down to lie flat, and in this state, a person such as a patient lies in an ordinary position. To let the lying person get up by lifting his/her back portion from this state, the switch SW5 is turned on to issue a command to the controller 6.

Figure 4:
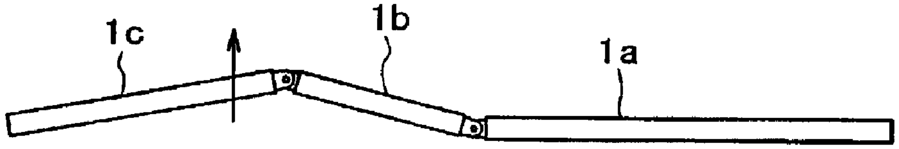
FIG. 4 is a side view showing the entire form of a bottom in another phase in the lifting action of bottom sections of the bed to which the method of controlling the coordinative lifting of bottom sections of this invention is applied.

Receiving the command, the controller 6 actuates at first the lifting mechanism of the knee bottom section 1*b* as shown in FIG. 4, to start lifting the knee bottom section 1*b* only. The time instant when the lifting of the knee bottom section 1*b* is started is t=0 in FIG. 9.

Figure 5:
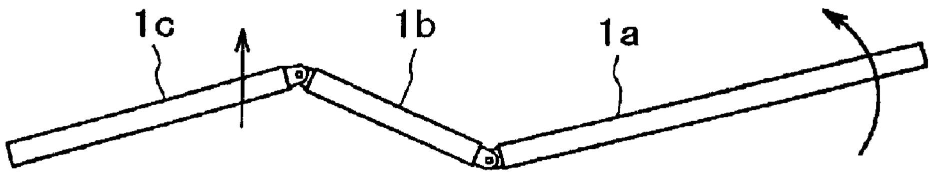
FIG. 5 is a side view showing the entire form of a bottom in a further other phase in the lifting action of bottom sections of the bed to which the method of controlling the coordinative lifting of bottom sections of this invention is applied.
Figure 6:
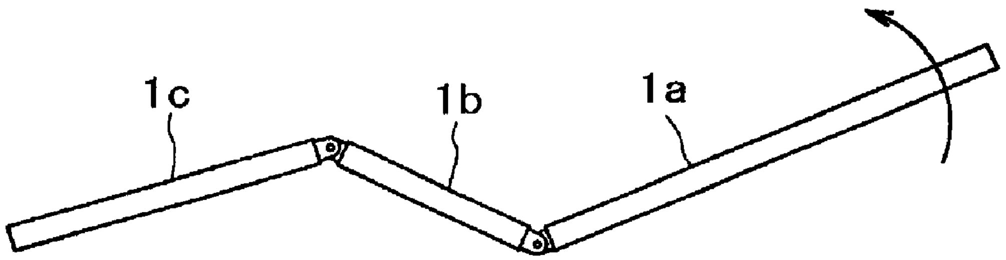
FIG. 6 is a side view showing the entire form of a bottom in a still further other phase in the lifting action of bottom sections of the bed to which the method of controlling the coordinative lifting of bottom sections of this invention is applied.
Figure 7:
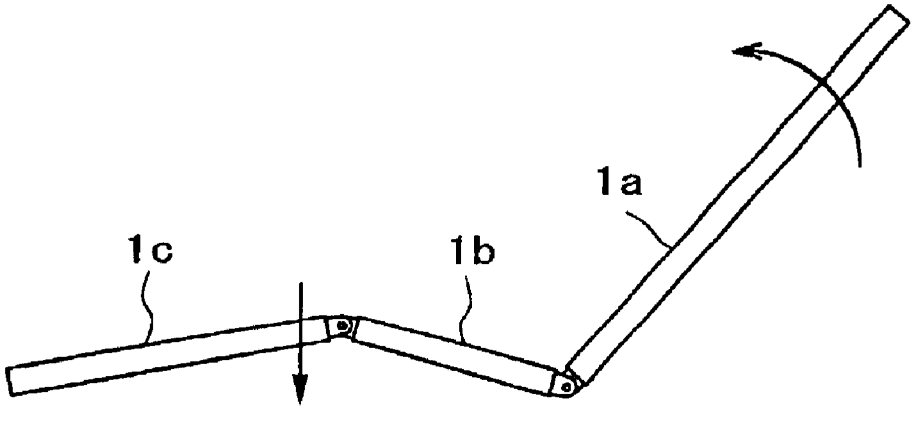
FIG. 7 is a side view showing the entire form of a bottom in a still further other phase in the lifting action of bottom sections of the bed to which the method of controlling the coordinative lifting of bottom sections of this invention is applied.
Figure 8:
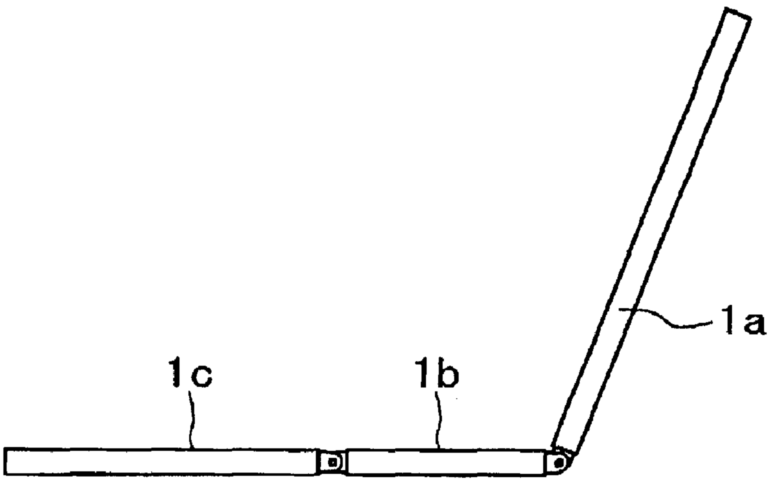
FIG. 8 is a side view showing the entire form of a bottom in a still further other phase in the lifting action of bottom sections of the bed to which the method of controlling the coordinative lifting of bottom sections of this invention is applied.

Then, receiving another command, the controller 6 starts lifting the back bottom section 1*a* at the time instant (t=T1) adequately later than the time instant when the lifting of the knee bottom section 1*b* is started, and thereafter as shown in FIG. 5, both the back bottom section 1*a* and the knee bottom section 1*b* are further lifted.

As described above, for pivotally rotating and lifting the back bottom section 1*a* from a flat state where all the bottom sections are kept down to lie flat, at first, the lifting of the knee bottom section 1*b* is started. Since the knee bottom section 1*b* is lifted, the knee bottom section 1*b* supports the position of the waist of the lying person, and therefore even if the lifting of the back bottom section is started in this state to gradually make the back bottom section steeply inclined, it can be prevented that the lying person is pressed at his/her back to slide down.

As described before, the lifting of the knee bottom section 1*b* can also be started simultaneously with or later than the lifting of the back bottom section 1*a*.

If the knee bottom section is lifted when the back bottom section is lifted as described above, the back bottom section lifts the back of the lying person, with his/her waist portion supported by the knee bottom section, it arises that the back of the lying person tends to slide upwardly against the frictional resistance. So, the external force in the sliding direction caused by the frictional force acting between his/her back and the back bottom section, hence the mattress, acts on his/her back, that is, the external force for pressing the back and the like downward acts on his/her back. Furthermore, if the lifting of the back bottom section and the lifting of the knee bottom section continue without any control, the angle formed between the back bottom section and the knee bottom section becomes gradually small to gradually bend his/her abdominal region, to finally let him/her feel a pressure.

Figure 9:
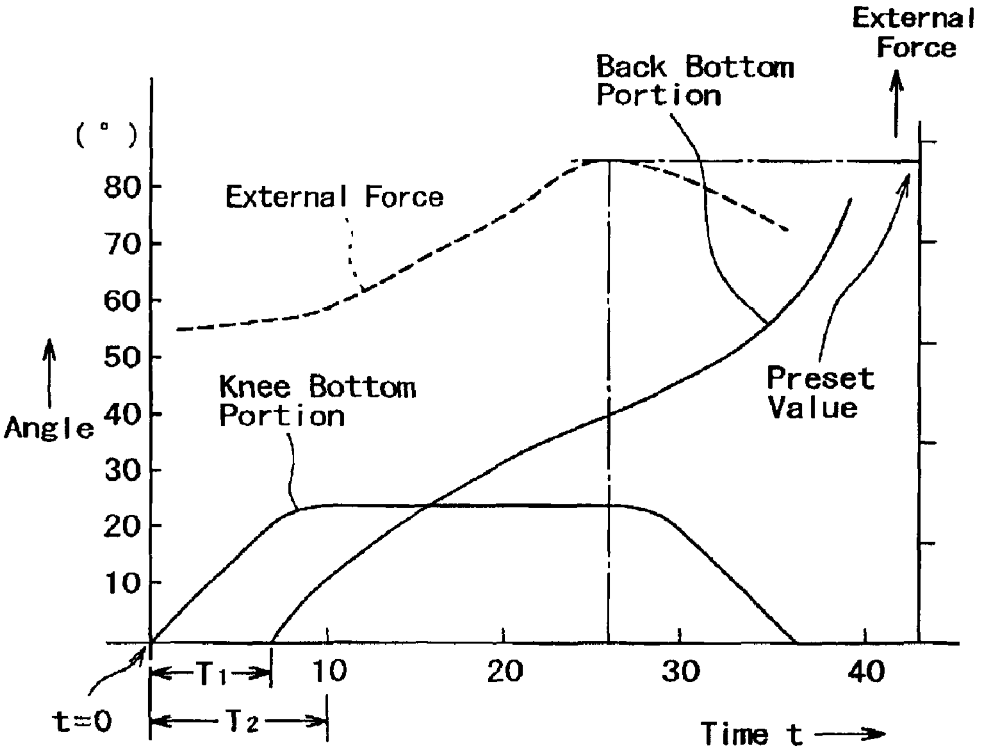
FIG. 9 is a diagram showing the changes in the inclination angles of the back bottom section and the knee bottom section of the bed with the lapse of time, as an example, to which the method of controlling the coordinative lifting of bottom sections of this invention is applied.

However, in this invention, the controller 6 monitors the signals of external forces in the sliding direction applied from the external force detecting means 8, indicated by the broken line of FIG. 9, and if the external force in the sliding direction reaches the pressure preset by the external force setting means Sf, the controller 6 changes the action of the lifting mechanism of the knee bottom section 1*b* for letting the knee bottom section descend, though it still allows the lifting of the back bottom section 1*a* to be continued.

Since the knee bottom section 1*b* is lowered like this, even if the back bottom section 1*a* is further lifted to form a sharp angle, the angle of the knee bottom section 1*b* becomes gradually smaller. So, the angle formed between the back bottom section 1*a* and the knee bottom section 1*b* does not become smaller, and therefore the aforesaid external force in the sliding direction does not become large. Thus, it can be prevented that the abdominal region of the lying person is gradually bent between the back bottom section 1*a* and the knee bottom section 1*b* to let the lying person feel a pressure.

In the above-mentioned control action, if it is arranged to ensure that the preset value of the external force in the sliding direction can be changed, the lifting of the knee bottom section can be controlled in response to the difference of each person in feeling the pressure.

Next, as a first method of detecting the time instant when the lifting of the back bottom section 1*a* is started (T=T1) later than the time instant when the lifting of the knee bottom section 1*b* is started (t=0), and/or the time instant when the knee bottom section 1*b* reaches its highest position (t=T2), to ensure that the controller 6 can carry out the above-mentioned control action in the lifting of the knee bottom section 1*b* and the lifting of the back bottom section 1*a*, the time elapsed from the time instant when the lifting of the knee bottom section 1*b* is started can be referred to for detecting said time instant.

In the case where the capacities of the drive sources such as motors for actuating the lifting mechanisms of the back bottom section 1*a* and the knee bottom section 1*b* are sufficiently larger than the forces necessary for lifting the back bottom section 1*a* and the knee bottom section 1*b* on which the external force of the lying person acts, or in the case where the external force is constant, there is a constant correlation between the time elapsed after the time instant of actuating a lifting mechanism and the position of the corresponding lifted bottom section 1*a* or 1*b*. So, the elapsed time easy to control can be used to carry out the above-mentioned control action in response to the lifted position of the bottom section 1*a* or 1*b*.

In this case, if it is arranged to ensure that the preset values of said time instants T1 and T2 in the controller 6 can be changed, an adequate control action suitable for various conditions such as the person lying on the bottom can be carried out.

As a second method of detecting the time instant when the lifting of the back bottom section 1*a* is started (T=T1) later than the time instant when the lifting of the knee bottom section 1*b* is started (t=0), and/or the time instant when the knee bottom section 1*b* reaches its highest position (t=T2), to ensure that the controller 6 can carry out the above-mentioned control action, a position detecting means such as an angle sensor can be installed for the knee bottom section 1*b*, for detecting the position. The position detecting means for the knee bottom section 1*b* can be installed at an adequate place, for example, the knee bottom section per se, the lifting mechanism or the drive source such as a motor.

Also in this case, if it is arranged to ensure that the respective portions can be preset, an adequate control action suitable for various conditions such as the person lying on the bottom can be carried out.

The control action of the back bottom section 1*a* and the knee bottom section 1*b* to which this invention is applied has been described as an action in the case where the back bottom section is pivotally rotated and lifted to be kept inclined from a flat state where all the bottom sections are kept down to lie flat. The action in the case where all the bottom sections are lowered to be flat from a lifted state where the back bottom section is kept most inclined after it has been pivotally rotated and lifted, is reverse to the action explained for the case of lifting. So, the explanation for the latter case of lowering is not made.

Also in the action for lowering, the knee bottom section lifted to a certain position is lowered, or it is lifted to the highest position and is lowered thereafter. So, the action of the knee bottom section like this in the case of lowering can prevent that the person lying on the bottom slides forward, and when the entire bottom becomes flat, the person lying on the bottom is not displaced. Therefore, the trouble that the caregiver must return the lying person to the original position can be saved.

In this invention, as the case may be, the back bottom section 1*a* and the knee bottom section 1*b* can also be lowered to lie flat in a coordinative manner different from that employed in the case where the back bottom section is pivotally rotated and lifted to be kept inclined from a flat state where all the bottom sections are kept down to lie flat. For example, in the case where the back bottom section is lowered, the lifting of the knee bottom section can precede the lowering of the back bottom section.

In the first embodiment of this invention described above, when the back bottom section 1*a* lifts the back of the lying person with his/her waist portion supported by the knee bottom section, the external force acting on his/her back and the like, i.e., the external force for pressing the back and the like downward is detected by the detecting means 8 installed in the mattress 3 in the portion corresponding to the back bottom section 1*a*, for inhibiting the lifting of the knee bottom section 1*b*. In the embodiment of this invention described below, the displacement of the lying person relatively to the back bottom section 1*a* caused by said external force is detected for controlling the knee bottom section 1*b*.

Figure 10:
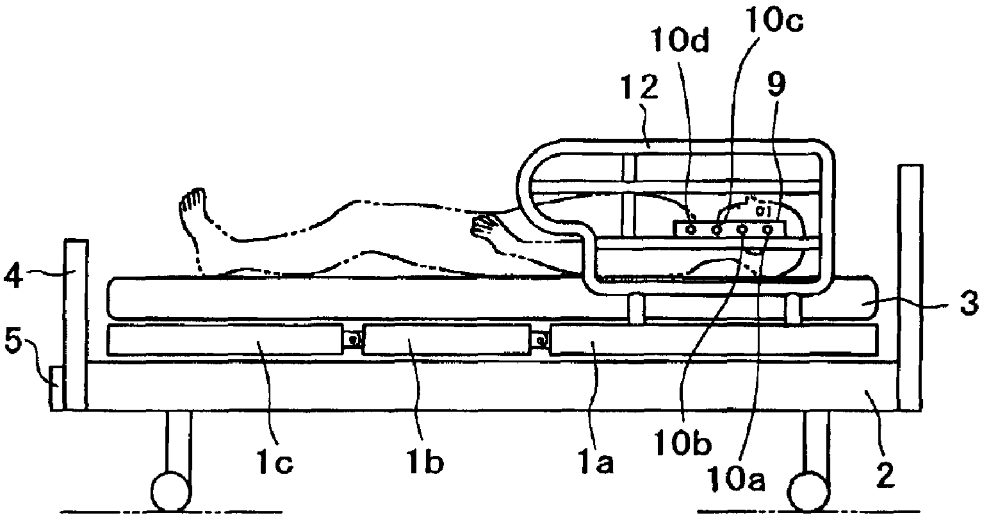
FIG. 10 is a side view showing another example of the entire bed to which the method of controlling the coordinative lifting of bottom sections of this invention is applied.
Figure 11:
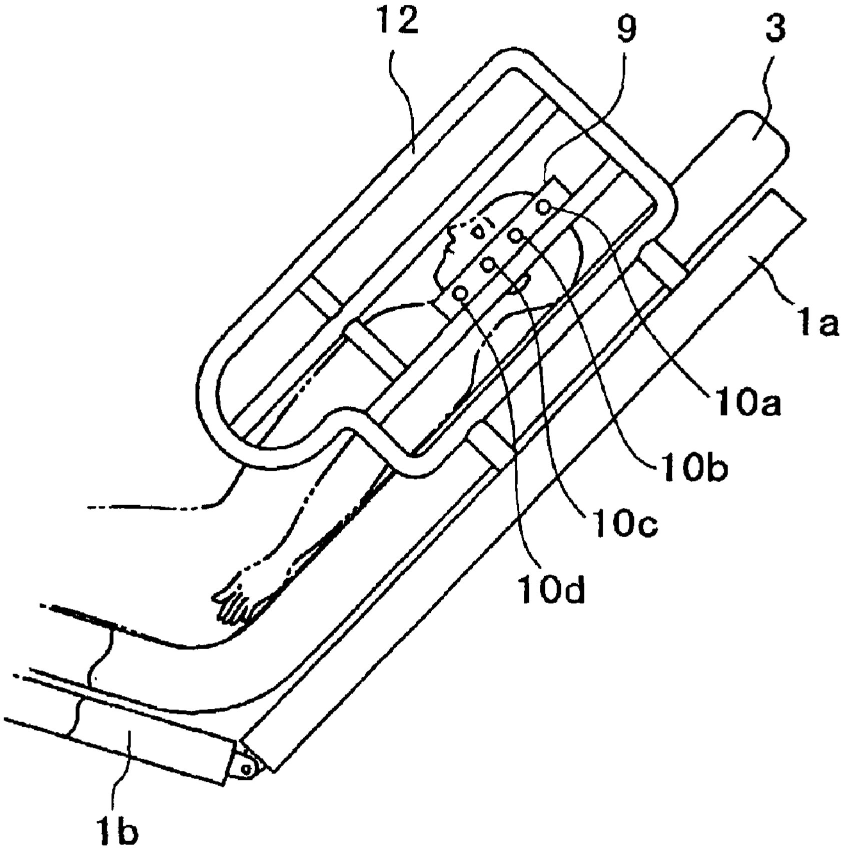
FIG. 11 is a side view showing an important portion of the bed of FIG. 10 in a state where the back bottom section and the knee bottom section are lifted.

FIG. 10 is a side view showing another example of the entire bed to which the method of controlling the coordinative lifting of bottom sections of this invention is applied. FIG. 11 is a side view showing the bed of FIG. 10, in which the back bottom section and the knee bottom section are lifted. The general constitution of the bed shown in these drawings is the same as that shown in FIG. 1, and the corresponding components are given the same symbols for avoiding double explanation.

In the bed shown in FIGS. 10 and 11, the displacement detecting means 9 consists of plural light beam type object detectors 10*a*, 10*b*, 10*c*, 10*d*, . . . , each consisting of a light emitting section and a light receiving section, are installed at the back bottom section 1*a*, i.e., in the side rails 12 mounted on the back bottom section 1*a* in this case, to ensure that the light beams of the object detectors run to cross the head region of the lying person (the side view shows only either the light emitting sections or the light receiving sections, and on the other side behind the illustrated lying person, there are the other sections).

In this constitution, the blocked beams of plural light beam type object detectors 10*a*, 10*b*, 10*c*, 10*d*, . . . can be detected as signals from their light receiving sections, and in reference to them, the position of the head region of the lying person can be detected. The position is detected every moment to detect the displacement of his/her head region.

In this embodiment of the invention, the displacement of the upper half of the lying person caused by the external force in the sliding direction is detected by said displacement detecting means 9, and when the displacement reaches a preset value, the knee bottom section 1*b* is controlled to descend. So, also in this mode, since it is prevented that the lifting of the knee bottom section 1*b* continues without any control, it does not happen at all that the angle formed between the back bottom section 1*a* and the knee bottom section 1*b* becomes smaller than a certain angle.

Figure 12:
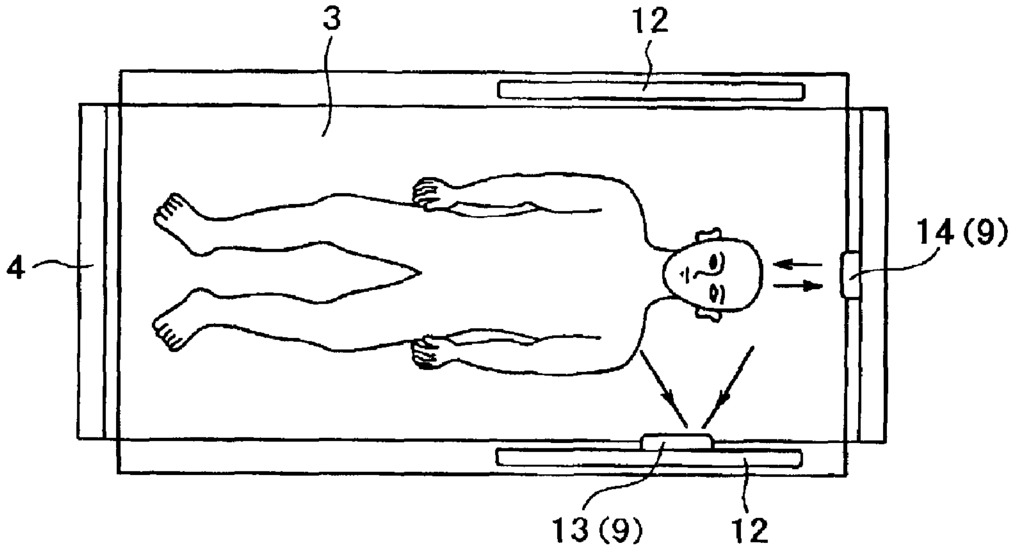
FIG. 12 is a plan view showing a further other example of the entire bed to which the method of controlling the coordinative lifting of bottom sections of this invention is applied.

FIG. 12 is a plan view showing further other examples of the entire bed to which the method of controlling the coordinative lifting of bottom sections of this invention is applied. The drawing shows other two examples of the displacement detecting means 9.

Symbol 13 denotes an imaging means for imaging the head region of the lying person from a lateral side, for example, a CCD camera that is installed in a side rail 12 mounted on the back bottom section 1*a*, as the displacement detecting means 9.

The CCD camera 13 is connected with an image processing means (not illustrated) that processes every moment the image of the head region of the lying person obtained from the lateral side. That is, the image processing means compares the image of the head region obtained at one moment with the image of the head region obtained at a previous moment, to detect the displacement of the head region. The method of detecting a displacement in reference to images like this is not described here in detail since it is well known.

Furthermore, symbol 14 denotes a distance sensor using an ultrasonic beam or the like. This distance sensor 14 is installed on the vertex side of the lying person, above the back bottom section 1*a* on the headboard 15 side, as the displacement detecting means 9.

The distance sensor as the displacement detecting means 9 can detect the displacement of the lying person in reference to the change of distance.

Any one of these displacement detecting means 9 can detect the displacement of the upper half of the lying person caused by the external force in the sliding direction, and when the displacement reaches a preset value, the knee bottom section 1*b* is controlled to descend. So, also in this embodiment of the invention, it can be prevented that the lifting of the knee bottom section 1*b* continues without any control, and therefore, it does not happen at all that the angle formed between the back bottom section 1*a* and the knee bottom section 1*b* becomes smaller than a certain angle.

INDUSTRIAL APPLICABILITY

As described above, this invention is lying furniture such as a bed or stretcher that has a back bottom section for lifting the back portion of a lying person and a knee bottom section for lifting his/her knee portion, in which the respective bottom sections can be lifted by the lifting mechanisms respectively provided for them, wherein when the back bottom section is pivotally rotated and lifted to be kept inclined from a flat state where all the bottom sections are kept down to lie flat, the knee bottom section is also adequately lifted, and the lifted knee bottom section supports the position of the waist of the lying person. Therefore, even if the back bottom section is lifted and gradually sharply inclined in this state, it can be prevented that the lying person slides down.

If the knee bottom section is lifted when the back bottom section is lifted as described above, the back bottom section lifts the back of the lying person, with his/her waist portion supported by the knee bottom section, it arises that the back of the lying person tends to slide upwardly against the frictional resistance. So, the external force in the sliding direction caused by the frictional force acting between his/her back and the back bottom section, hence the mattress, acts on his/her back, that is, the external force for pressing the back and the like downward acts on his/her back. Furthermore, if the lifting of the back bottom section and the lifting of the knee bottom section continue without any control, the angle formed between the back bottom section and the knee bottom section becomes gradually small to gradually bend his/her abdominal region, to finally let him/her feel a pressure.

However, in this invention, the external force in the sliding direction is detected by an external force detecting means, or the displacement of the lying person caused by the external force is detected by a displacement detecting means, and when the external force or the displacement reaches a preset value, the knee bottom section is controlled to descend. So, it can be prevented that the lifting of the knee bottom section continues without any control, and it does not happen at all that the angle formed between the back bottom section and the knee bottom section becomes smaller than a certain angle.

Therefore, it can be prevented that the gradually narrowing angle bends the abdominal region of the lying person, to let him/her feel a pressure.

What is claimed is:

1. In a method of controlling coordinative lifting of bottom sections of lying furniture that have a back bottom section for lifting a back portion of a lying person and a knee bottom section for lifting his/her knee portion, in which respective bottom sections can be lifted by a lifting mechanisms respectively provided for them, and the back bottom section is provided with an external force detecting means for detecting a external force in a sliding direction acting on the back of the lying person when the back bottom section is lifted while the knee bottom section is kept lifted, the improvement comprising the steps of:

(a) pivotally rotating and lifting the back bottom section from a flat state where all bottom sections in a down position lie flat, (b) lifting the knee bottom section to an adequate height, and then (c) lowering the knee bottom section when an external force in a sliding direction acting on the back of a lying person reaches a preset value.

2. The method of controlling the coordinative lifting of bottom sections of lying furniture, according to claim 1, wherein the preset value of the external force in the sliding direction can be changed.

3. The method of controlling the coordinative lifting of bottom sections of lying furniture, according to claim 1, wherein said external force detecting means consists of a plate corresponding to the back of a lying person, a base supporting the plate movably in a plane direction and strain gauges installed between the plate and the base.

4. In a method of controlling the coordinative lifting of bottom sections of lying furniture that have a back bottom section for lifting a back portion of a lying person and a knee bottom section for lifting his/her knee portion, in which respective bottom sections can be lifted by lifting mechanisms respectively provided for them, and a back bottom section is provided with a displacement detecting means for detecting a displacement of a lying person caused when a back bottom section is lifted while a knee bottom section is kept lifted, the improvement comprising the steps of:

(a) pivotally rotating and lifting the back bottom section from a flat state when all bottom sections in a down position lie flat, (b) lifting the knee bottom section to an adequate height, and then (c) lowering the knee bottom section when a displacement of an upper half of a lying person reaches a preset value.

5. The method of controlling the coordinative lifting of bottom sections of lying furniture, according to claim 4, wherein the preset value of displacement can be changed.

6. The method of controlling the coordinative lifting of bottom sections of lying furniture, according to claim 4, wherein a displacement detecting means is an imaging means installed at a back bottom section for imaging a head of a lying person from a lateral side, to ensure that a displacement of an imaged head of a lying person can be detected in reference to a displaced image of the head obtained by the imaging means.

7. The method of controlling the coordinative lifting of bottom sections of lying furniture, according to claim 4, wherein the displacement detecting means is a plural light beam type object detectors, each consisting of a light emitting section and a light receiving section, installed at a back bottom section in such a manner that light beams cross a head region of the lying person.

8. The method of controlling the coordinative lifting of bottom sections of lying furniture wherein the displacement detecting means is a distance sensor installed at a back bottom section for measuring a distance to a vertex of a lying person, to detect a change of distance.

9. The method of controlling the coordinative lifting of bottom sections of lying furniture, according to claim 1, when a back bottom section is pivotally rotated and lifted to be kept inclined from a flat state where all the bottom sections are kept down to lie flat, further comprising starting simultaneously lifting of the back bottom section the knee bottom section.

10. The method of controlling the coordinative lifting of bottom sections of lying furniture according to claim 1, further comprising, first starting the lifting of the back bottom section in step (a), and then, and at a time instant adequately later, starting the lifting of the knee bottom section.

11. The method of controlling the coordinative lifting of bottom sections of lying furniture according to claim 1, wherein when the back bottom section is pivotally rotated and lifted to be kept inclined from a flat state where all the bottom sections are kept down to lie flat, the lifting of the knee bottom section is started first, and at a time instant adequately later, the lifting of the back bottom section is started.

12. The method of controlling the coordinative lifting of bottom sections of lying furniture according to claim 2, wherein when the back bottom section is pivotally rotated and lifted to be kept inclined from a flat state where all the bottom sections are kept down to lie flat, lifting of the back bottom section and the lifting of the knee bottom section are started simultaneously.

13. The method of controlling the coordinative lifting of bottom sections of lying furniture according to claim 3, wherein when the back bottom section is pivotally rotated and lifted to be kept inclined from a flat state where all the bottom sections are kept down to lie flat, lifting of the back bottom section and the lifting of the knee bottom section are started simultaneously.

14. The method of controlling the coordinative lifting of bottom sections of lying furniture according to claim 4, wherein when the back bottom section is pivotally rotated and lifted to be kept inclined from a flat state where all the bottom sections are kept down to lie flat, lifting of the back bottom section and the lifting of the knee bottom section are started simultaneously.

15. The method of controlling the coordinative lifting of bottom sections of lying furniture according to claim 2, wherein when the back bottom section is pivotally rotated and lifted to be kept inclined from a flat state where all the bottom sections are kept down to lie flat, lifting of the back bottom section is started at first, and at a time instant adequately later than said lifting start time, lifting of the knee bottom section is started.

16. The method of controlling the coordinative lifting of bottom sections of lying furniture according to claim 3, wherein when the back bottom section is pivotally rotated and lifted to be kept inclined from a flat state where all the bottom sections are kept down to lie flat, lifting of the back bottom section is started at first, and at a time instant adequately later than said lifting start time instant, lifting of the knee bottom section is started.

17. The method of controlling the coordinative lifting of bottom sections of lying furniture according to claim 4, wherein when the back bottom section is pivotally rotated and lifted to be kept inclined from a flat state where all the bottom sections are kept down to lie flat, lifting of the back bottom section is started at first, and at a time instant adequately later than said lifting start time instant, lifting of the knee bottom section is started.

18. The method of controlling the coordinative lifting of bottom sections of lying furniture according to claim 2, wherein when the back bottom section is pivotally rotated and lifted to be kept inclined from a flat state where all the bottom sections are kept down to lie flat, lifting of the knee bottom section is started at first, and at a time instant adequately later than said lifting start time, lifting of the back bottom section is started.

19. The method of controlling the coordinative lifting of bottom sections of lying furniture according to claim 3, wherein when the back bottom section is pivotally rotated and lifted to be kept inclined from a flat state where all the bottom sections are kept down to lie flat, lifting of the knee bottom section is started at first, and at a time instant adequately later than said lifting start time instant, lifting of the back bottom section is started.

20. The method of controlling the coordinative lifting of bottom sections of lying furniture according to claim 4, wherein when the back bottom section is pivotally rotated and lifted to be kept inclined from a flat state where all the bottom sections are kept down to lie flat, lifting of the knee bottom section is started at first, and at a time instant adequately later than said lifting start time, lifting of the back bottom section is started.

* * * * *